United States Patent
Abe et al.

(10) Patent No.: US 6,657,155 B2
(45) Date of Patent: Dec. 2, 2003

(54) METHOD OF AND APPARATUS FOR MAKING A THREE-DIMENSIONAL OBJECT

(75) Inventors: Satoshi Abe, Moriguchi (JP); Norio Yoshida, Kitakatsuragi-gun (JP); Yoshikazu Higashi, Moriyama (JP); Hirohiko Togeyama, Tondabayashi (JP); Isao Fuwa, Osaka (JP); Shushi Uenaga, Moriguchi (JP); Seizo Machida, Osaka (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/964,626

(22) Filed: Sep. 28, 2001

(65) Prior Publication Data

US 2002/0041818 A1 Apr. 11, 2002

(30) Foreign Application Priority Data

Oct. 5, 2000 (JP) ........................ 2000-306546

(51) Int. Cl.$^7$ ............................................. B23K 26/36
(52) U.S. Cl. ................................................ 219/121.6
(58) Field of Search ........................ 219/121.6, 121.63, 219/121.64, 121.65, 121.66, 121.82, 121.83, 121.84

(56) References Cited

U.S. PATENT DOCUMENTS 5,431,967 A * 7/1995 Manthiram et al.
5,817,206 A * 10/1998 McAlea et al.

FOREIGN PATENT DOCUMENTS

| JP | 8-260163 | 10/1996 |
| JP | 2000-73108 | 3/2000 |
| WO | 88/02677 | 4/1988 |

OTHER PUBLICATIONS

English Language Abstract of JP 2000–73108.
English Language Abstract of JP 8–260163.

* cited by examiner

Primary Examiner—Samuel M. Heinrich
(74) Attorney, Agent, or Firm—Greenblum & Bernstein, P.L.C

(57) ABSTRACT

To make a three-dimensional object, an optical beam is first irradiated on a predetermined portion of a powder layer to form a sintered layer, which is then covered with a new powder layer. The optical beam is again irradiated on a predetermined portion of the new powder layer to form another sintered layer that has been united with the underlying sintered layer. These processes are repeatedly carried out to form a plurality of sintered layers united together, which have a size greater than that of a target shape of the three-dimensional object. A surface region of a shaped object formed by then is removed during the formation of the plurality of sintered layers.

16 Claims, 14 Drawing Sheets

METHOD OF AND APPARATUS FOR MAKING A THREE-DIMENSIONAL OBJECT

BACKGROUND OF THE INVENTION

1. Field of the Invention

The present invention relates to a method of and apparatus for making a three dimensional object in which a target object is obtained by sintering and hardening powder material with an optical beam.

2. Description of the Related Art

Japanese Patent No. 2620353 discloses a method of making a three-dimensional object known as photo-shaping. According to this Patent, as shown in FIG. 21A, an optical beam L is first irradiated on a predetermined portion of a layer of powder material, which is either an organic material or an inorganic material, to form a sintered layer 11. The sintered layer 11 thus obtained is then covered with a new layer of powder material, and the optical beam L is irradiated on a predetermined portion of the new layer to form a new sintered layer 11, which is united with the underlying layer 11. These processes are repeatedly carried out to form a sintered article or three-dimensional object in which a plurality of sintered layers 11 are firmly laminated one above another. According to this method, the irradiation of the optical beam L is conducted based on sectional form data of each of the layers that are obtained by slicing a model of design data (CAD data) of the three-dimensional object into a desired thickness. For this reason, without a CAM device, the method referred to above can be used to make a three-dimensional object of an arbitrary shape and to obtain any shaped object of a desired shape quickly, compared with a method with the use of cutting work.

According to this method, however, as shown in FIG. 21A, unnecessary powder 15 adheres to the sintered and hardened portions due to heat transmitted therefrom, thereby forming a surface layer 16 of a low density on the shaped object.

Japanese Laid-Open Patent Publication (unexamined) No. 2000-73108 discloses removing stepped outer portions as shown in FIG. 21B that result from the lamination of the sintered layers 11. However, even if the stepped outer portions have been removed, as shown in FIG. 21C, the low-density surface layer 16 still remains and, hence, no smooth outer surface can be obtained.

Furthermore, unless the sintered layers are caused to have a sufficient density (for example, a porosity less than 5%) during the sintering, removal of the stepped outer portions does not result in a smooth outer surface because pores appear on the surface of the sintered layers even after such removal.

Also, where the shaped object is finished for removal of the low-density surface layer after the shaping, there are some limits to finishing tools depending on the shape of the shaped object. By way of example, it becomes occasionally impossible to cut relatively deep and narrow grooves because small-diameter tools have a limit in length. In this case, additional electric discharge machining is required, giving rise to problems in terms of time and cost.

In addition, because the entire three-dimensional object is made by the powder-sintering method, or because each powder layer is sintered by irradiating a laser beam thereto, it sometimes takes a long time depending on the shape of the three-dimensional object to be made.

SUMMARY OF THE INVENTION

The present invention has been developed to overcome the above-described disadvantages.

It is accordingly an objective of the present invention to provide an improved method and apparatus capable of making a three-dimensional object in a short time.

Another objective of the present invention is to provide the method and apparatus of the above-described type, which is capable of finishing the object surface smoothly at a low cost irrespective of the shape thereof.

In accomplishing the above and other objectives, the method according to the present invention includes the steps of: (a) irradiating an optical beam on a predetermined portion of a powder layer to form a sintered layer; (b) covering the sintered layer with a new powder layer; (c) irradiating the optical beam on a predetermined portion of the new powder layer to form another sintered layer that has been united with the underlying sintered layer; (d) repeating the steps (b) and (c) to form a plurality of sintered layers united together, which have a size greater than that of a target shape of the three-dimensional object; and (e) removing a surface region of a shaped object formed by then during the step (d).

Because the step (e) is carried out during the step (d), it becomes possible to finish the object surface without any restrictions by the size of a finishing machine such as the length of a drill or the like.

The method according to the present invention may further include, prior to the step (a), the steps of: (a1) placing on a sintering table a base that constitutes a lower structure of the three-dimensional object; (a2) machining the base; and (a3) aligning the base with a laser beam irradiating position.

The provision of the base dispenses with the formation and the sintering of a certain number of powder layers corresponding to the thickness of the base, making it possible to reduce the time required for making a three-dimensional object that has been hitherto made via a number of sintering processes. The provision of the base is also effective to make a three-dimensional object having narrow grooves of a high aspect ratio.

Prior to the step (a1), the time required for machining the base is compared with the time required for forming a plurality of sintered layers of a same shape as the base, and if the former is determined to be shorter than the latter, the base is made.

If the base has a recess in which some of the sintered layers are formed or an even surface on which a lowermost sintered layer is formed, the bonding strength between the base and the sintered layers can be increased.

It is preferred that the surface region removed has a thickness greater than a thickness of a low-density surface layer created by adhesion of powder material to the sintered layers. By so doing, the object surface can be smoothly finished.

If the sintered layers are exposed by the removal of the surface region, the exposed surface has a high density and is hence smooth.

Where the removal of the surface region is carried out by cutting, it is preferred that an optical beam be irradiated on a portion to be removed to soften it, prior to the step (e). The irradiation of the optical beam acts to reduce the cutting force, making it possible to reduce the cutting time and prolong the life of a cutting tool.

The removal of the surface region may be carried out by a laser.

Advantageously, after the step (e), an optical beam is irradiated on a portion of the shaped object from which the surface region has been removed, thereby increasing the density of such portion.

Again advantageously, unsintered powder around the sintered layers or swarf produced by the removal of the surface region is removed during the step (e). By so doing, a new powder layer formed after that is not adversely affected by such swarf.

The unsintered powder around the sintered layers may be removed prior to the step (e). In this case, because no swarf does not mix with the unsintered powder, the unsintered powder can be reused.

After the step (e), a space from which the unsintered powder or swarf has been removed may be filled with resin or wax. The use of resin or wax makes it possible to reduce the amount of powder when a new powder layer is subsequently formed.

Prior to the step (e), the unsintered powder may be solidified by freezing or using resin or wax. In this case, no refilling of powder material is required, and only the swarf can be removed without difficulty.

On the other hand, the apparatus according to the present invention includes a powder layer-forming unit for forming a powder layer, a sintered layer-forming unit for forming a sintered layer by irradiating an optical beam on a predetermined portion of the powder layer, a distance regulator for regulating a distance between the sintered layer-forming unit and the sintered layer, and a surface layer-removing unit for removing a surface layer of a density lower than that of the sintered layer.

The apparatus of the above-described construction contributes to improve the quality of the object surface.

The apparatus may further include a discharge unit held in close proximity to the powder layer-forming unit for discharging unsintered powder or swarf produced by the surface layer-removing unit. The discharge unit acts to prevent a new powder layer from being adversely affected by the swarf.

The discharge unit may have a drive unit that acts to move the discharge unit along a contour line of each plane to be shaped.

BRIEF DESCRIPTION OF THE DRAWINGS

The above and other objectives and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

This application is based on applications Nos. 2000-306546 and 2001-192121 filed Oct. 5, 2000 and Jun. 26, 2001, respectively, in Japan, the content of which is herein expressly incorporated by reference in its entirety.

Figure 1:
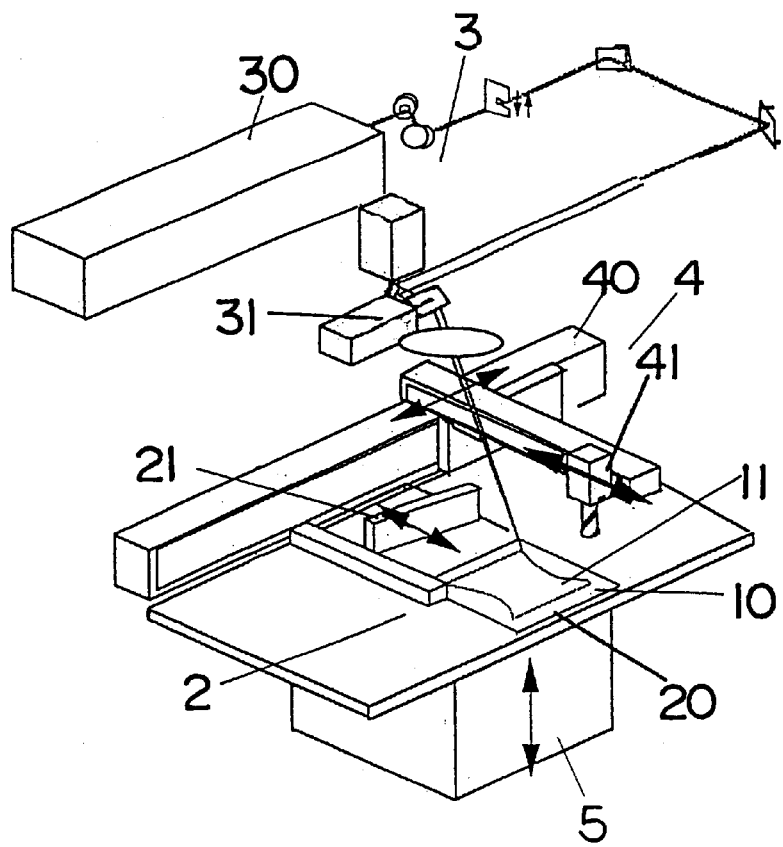
FIG. 1 is a schematic perspective view of an apparatus for making a three-dimensional object according to a first embodiment of the present invention.

Referring now to the drawings, there is shown in FIG. 1 an apparatus for making a three-dimensional object according to a first embodiment of the present invention. The apparatus shown therein includes a powder layer-forming unit 2 for forming a powder layer 10, a sintered layer-forming unit 3 for forming a sintered layer 11, and a surface layer-removing unit 4 for removing a low-density surface layer. The powder layer-forming unit 2 forms the powder layer 10 of a desired thickness $\Delta t1$ by supplying organic or inorganic powder material on a sintering table 20 that moves vertically within a space surrounded by a cylinder and by leveling the powder material with the use of a leveling blade 21. The sintering table 20 is driven by a drive unit 5 so as to move up and down. The sintered layer-forming unit 3 forms the sintered layer 11 by irradiating a laser emitted from a laser beam generator 30 on the powder layer 10 via a scanning optical system including a deflector 31 and the like. A laser oscillator is preferably used as the laser beam generator 30. The surface layer-removing unit 4 includes an XY drive unit 40 mounted on a base thereof and a finishing machine 41 mounted on the XY drive unit 40. It is preferred that the XY drive unit 40 be driven at a high speed using a linear motor. A galvanomirror is preferably used as the deflector 31. A cutting machine such, for example, as an end mill or a drilling machine, a laser beam machine, or a blasting machine for carrying out plastic working with respect to an object by blowing sintered powder against it is preferably used as the finishing machine 41. A polar coordinates drive unit may be used in place of the XY drive unit 40.

Figure 2:
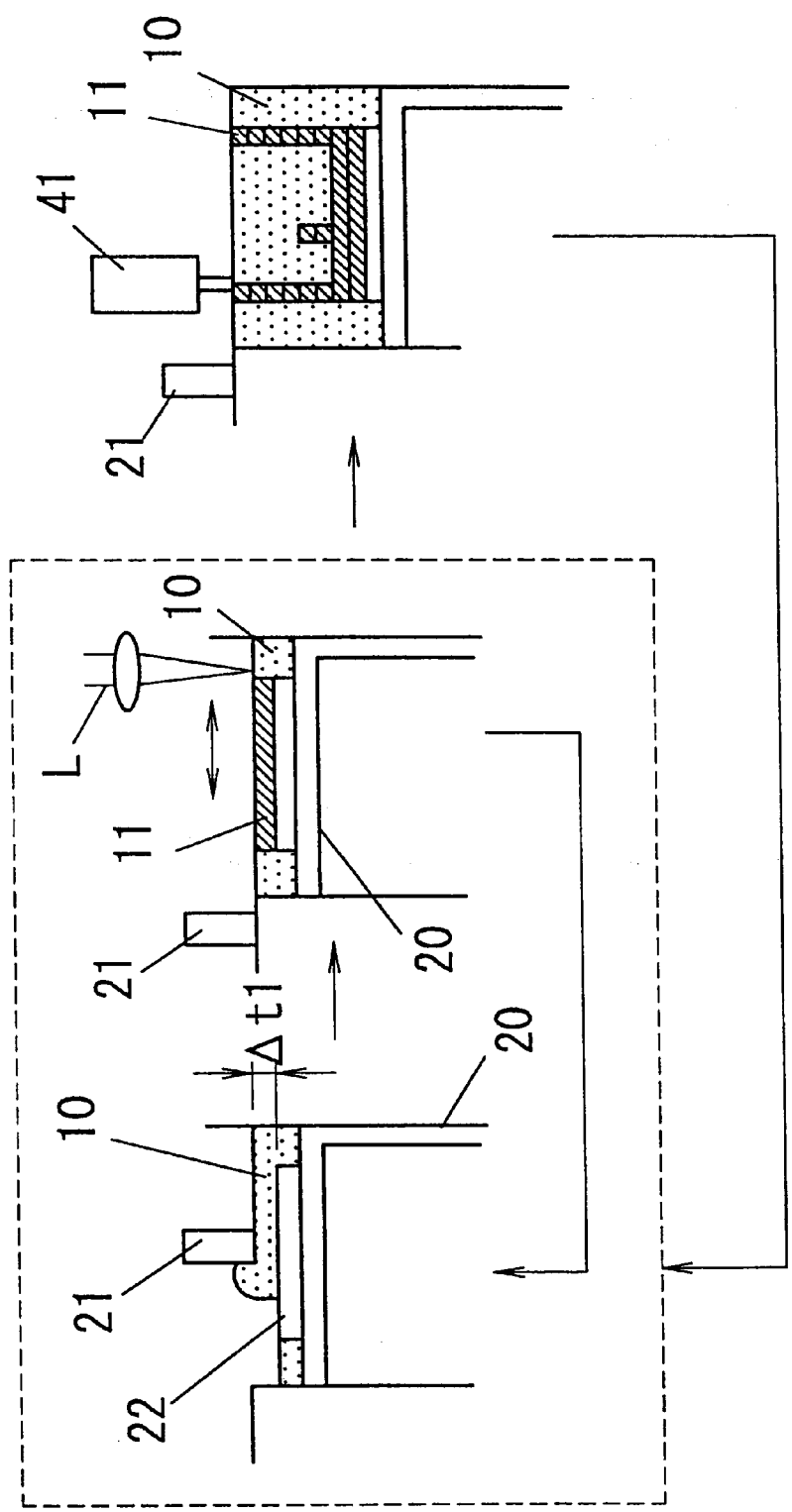
FIG. 2 is a schematic elevational view of the three-dimensional object being created.

FIG. 2 depicts how to make a three-dimensional object using the apparatus referred to above. As shown therein, the organic or inorganic powder material is first supplied on a base 22 mounted on the sintering table 20, which is employed as a distance regulator for regulating the distance between the sintered layer-forming unit 3 and a sintered layer. The powder material supplied on the base 22 is then leveled by the leveling blade 21 to form a first powder layer 10, and an optical beam (laser beam) L is irradiated on a desired portion of the first powder layer 10 to sinter it, thereby forming a sintered layer 11 united with the base 22.

Thereafter, the sintering table 20 is lowered by a predetermined length, and a second powder layer 10 is formed by supplying the powder material again and by leveling it using the leveling blade 21. The optical beam L is again irradiated on a desired portion of the second powder layer 10 to sinter it, thereby forming another sintered layer 11 united with the underlying sintered layer 11.

The process of forming a new powder layer 10 after the sintering table 20 has been lowered and the process of irradiating the optical beam L on a desired portion of the new powder layer 10 to form a new sintered layer 11 are repeatedly carried out, thereby making the three-dimensional object. Generally spherical iron powder particles having an average diameter of about 20 $\mu$m are preferably used for the powder material, and a $CO_2$ laser is preferably used as the optical beam. The preferred thickness $\Delta t1$ of each powder layer 10 is about 0.05 mm.

Figure 3:
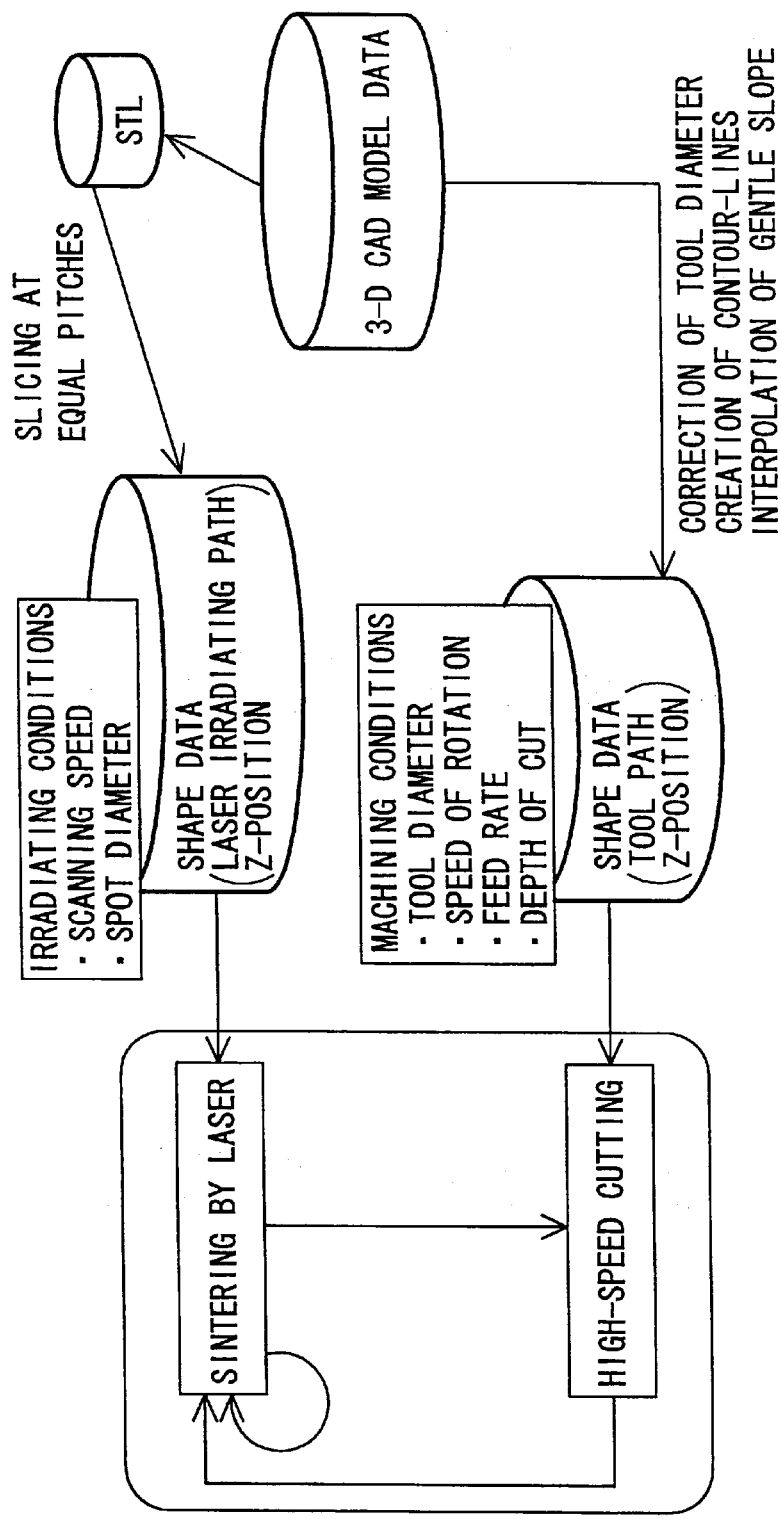
FIG. 3 is a data flow indicative of how to make the three-dimensional object.

FIG. 3 schematically depicts an example of a data flow according to the present invention. This data flow makes a desired three-dimensional CAD model have two kinds of data, data indicative of a path for laser irradiation and data indicative of a path for cutting. These paths are prepared from three-dimensional CAD data designed in advance to indicate the desired shape.

The path for laser irradiation is substantially the same as that in the conventional shaping method, in which the target shape is defined by contour data for each section that has been obtained by slicing STL data, created from the three-dimensional CAD model, at equal pitches (0.05 mm in this embodiment). The contour data are added with laser irradiation conditions (the scanning speed, spot diameter, power and the like) to create new data, which are in turn delivered to the finishing process.

The path for cutting is a path obtained in consideration of the diameter, kind, feed rate, speed of rotation etc. of the finishing tool to be used in the three-dimensional CAM. The data indicative of this path are also delivered to the finishing process.

The data indicative of the path for laser irradiation are used in a laser sintering process, while the data indicative of the path for cutting are used in a high-speed cutting process. These two processes are repeatedly carried out to finish the target object.

Figure 4:
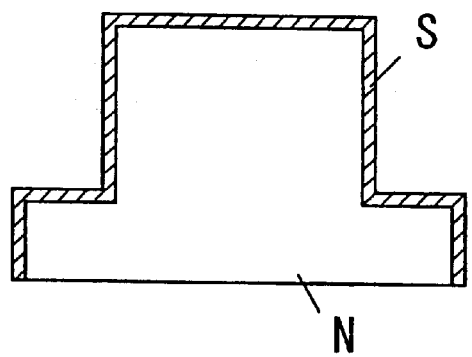
FIG. 4 is a schematic elevational view of a model having a high-density surface region.

It is preferred that the irradiation of the optical beam be conducted so that at least the surface region of the three-dimensional object is sintered to have a high density (for example, a porosity less than 5%). The reason for this is that even if the surface layer is removed by the surface layer-removing unit 4 and if the surface region has a low density, the surface exposed after the surface removing process is still porous. Accordingly, the model data are divided into those for the surface region S and those for the inner region N, as shown in FIG. 4, and the optical beam is irradiated under the conditions in which the inner region N comes to be porous and the surface region S comes to have a high density upon melting of most of the powder material therein.

Figure 5A:
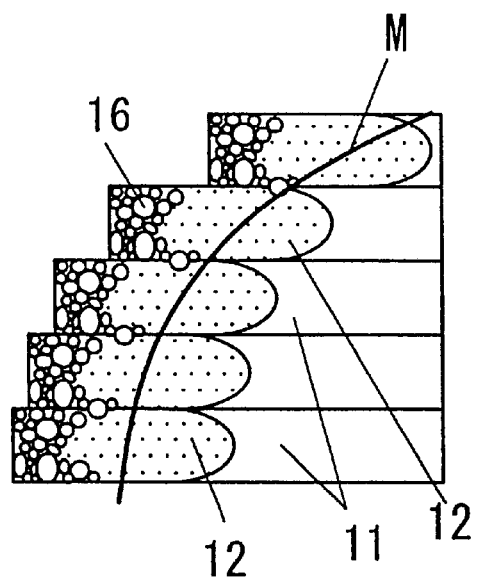
FIG. 5A is a vertical sectional view of a plurality of sintered layers.

In FIG. 5A, reference numeral 12 denotes a high-density region, and reference numeral 16 denotes a low-density surface layer that has been created by the adhesion of the powder material, as discussed above. The inner portion located inside the high-density region 12 has a density lower than that of the high-density region 12 but higher than that of the low-density surface layer 16.

During the formation of a plurality of sintered layers 11, when the total thickness thereof reaches a specific value that has been determined from the tool length of a milling head 41, for example, the surface layer-removing unit 4 is activated to cut the surface of the three-dimensional object that has been shaped by that time. For example, a tool (ball end mill) of the milling head 41 having a diameter of 1 mm and an effective blade length of 3 mm can achieve cutting of a depth of 3 mm. Accordingly, if the thickness $\Delta t1$ of the powder layer 10 is 0.05 mm, the surface layer-removing unit 4 is activated when sixty sintered layers 11 have been formed.

Figure 5B:
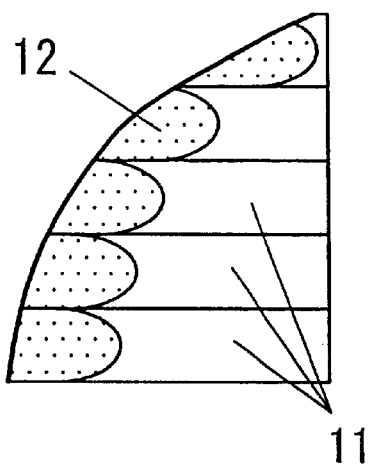
FIG. 5B is a vertical sectional of the plurality of sintered layers after a surface region thereof has been removed.

As shown in FIG. 5A, such surface layer-removing unit 4 can remove the low-density surface layer 16 created by the adhesion of the powder to the surface of the shaped object and can simultaneously cut out a portion of the high-density region 12, thereby exposing the high-density region 12 over the entire surface of the shaped object, as shown in FIG. 5B. To this end, the shape of the sintered layers 11 is formed into a size slightly greater than that of a desired shape M.

By way of example, when the optical laser L is irradiated along a desired contour line under the conditions given below, the horizontal size (width) of each sintered layer 11 comes to be about 0.3 mm greater than that of the desired shape M.

Laser Power: 200W
Laser Spot Diameter: 0.6 mm
Scanning Speed: 50 mm/s

The excess thickness in the vertical direction may be equal to or different from that in the horizontal direction. The vertical size of the shape of the sintered layers 11 is obtained by modifying the original data indicative of the vertical size of the desired shape M.

Figure 6A:
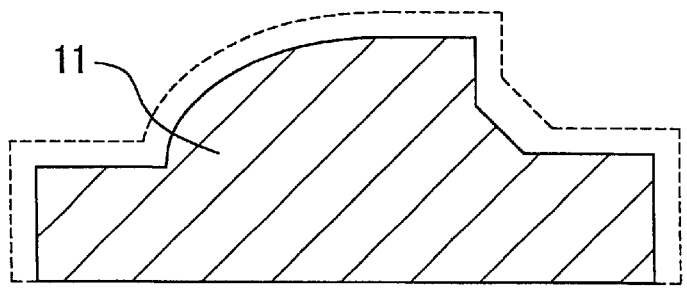
FIG. 6A is a schematic vertical sectional view of a shaped object having a uniform excess thickness.
Figure 6B:
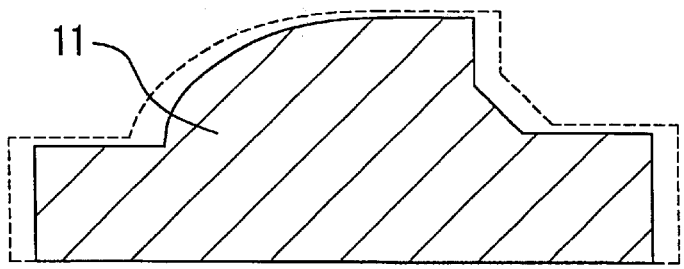
FIG. 6B is a view similar to FIG. 6A, depicting another shaped object having a varying excess thickness.

FIG. 6A depicts the case where the excess thickness in the horizontal direction is substantially the same as that in the vertical direction, while FIG. 6B depicts the case where the excess thickness in the horizontal direction differs from that in the vertical direction. In FIGS. 6A and 6B, a dotted line indicates the shape of the sintered layers 11, while a solid line indicates the desired shape M.

Figure 7:
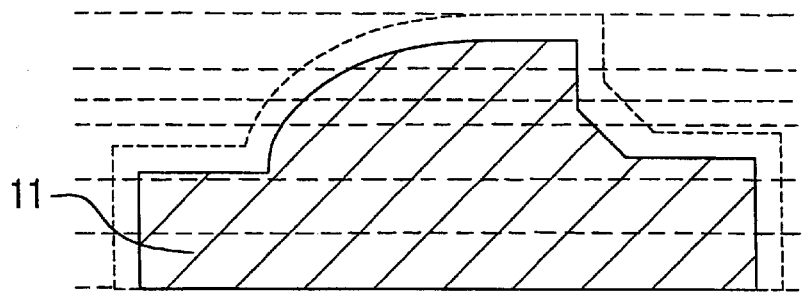
FIG. 7 is a view similar to FIG. 6A, depicting the vertical pitch of cutting when the target object has a gentle slope.

As described previously, the path for cutting as well as the path for laser irradiation is prepared from the three-dimensional CAD data. Although the path for cutting is determined based on the so-called contour-line processing, the vertical pitch of the path for cutting is not always required to be the same as the pitch of lamination during sintering. If the target object has a gentle slope as shown in FIG. 7, a smooth surface can be obtained by reducing the vertical pitch.

In the case where the cutting is carried out using a ball end mill of a diameter of 1 mm, it is preferred that the depth of cut, the feed rate, and the speed of rotation of the tool be set to 0.1–0.5 mm, 5–50 m/min, and 20,000–100,000 rpm, respectively.

Figure 8:
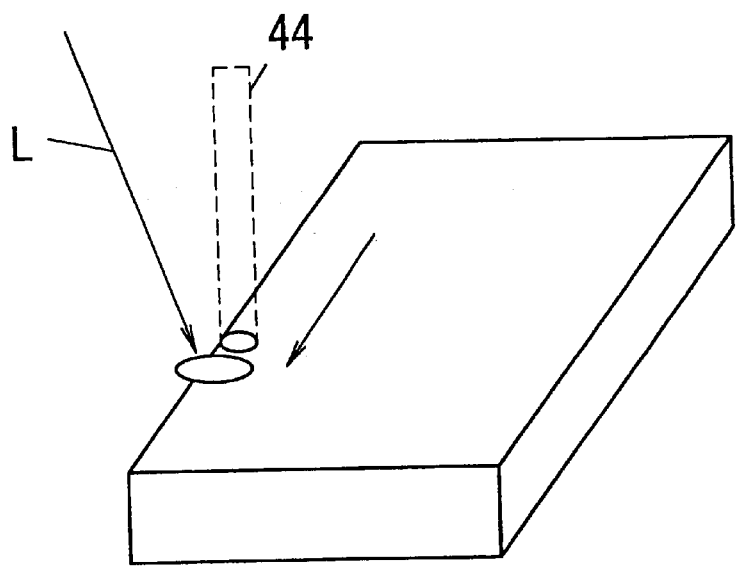
FIG. 8 is a perspective view of a shaped object when a portion thereof located immediately before a cutting tool is being irradiated with an optical beam.

The cutting may be carried out in such a manner as shown in FIG. 8. More specifically, the portion of the object located immediately before a tool 44 is irradiated with and heated by an optical beam (laser beam) L having a small energy density so that the former may be softened by the latter. By cutting the softened portion with the tool 44, the cutting force is reduced, making it possible to reduce the cutting time and prolong the life of the tool 44.

Figure 9:
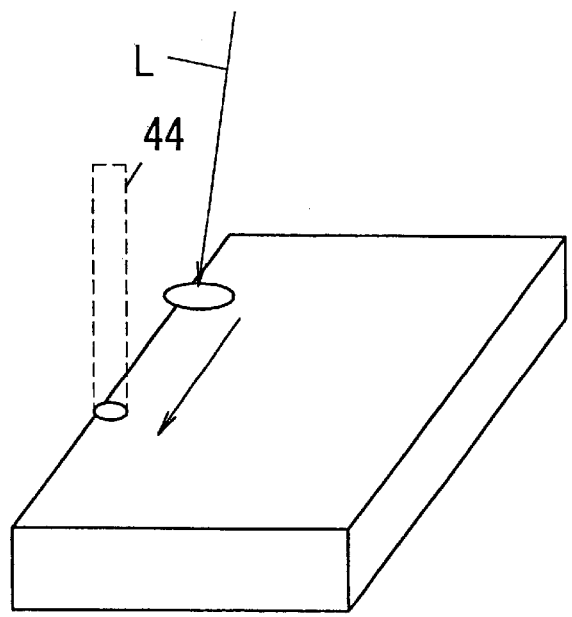
FIG. 9 is a view similar to FIG. 8, when the optical beam is being irradiated on a portion immediately after the cutting tool has passed.

Also, as shown in FIG. 9, the optical beam L may be irradiated on the portion immediately after the tool 44 has passed. By so doing, such portion is melted and hardened or heat-treated, thus increasing the density.

Figure 10:
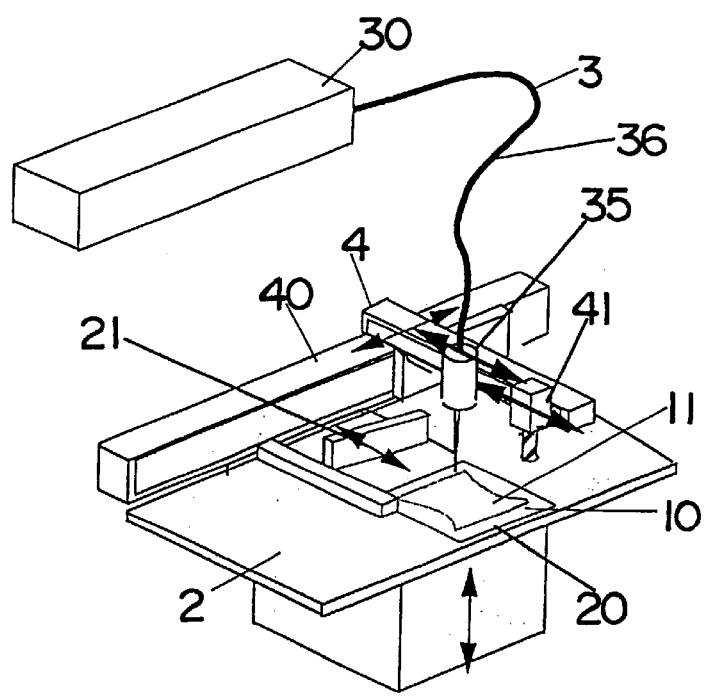
FIG. 10 is a schematic perspective view of a modification of the apparatus shown in FIG. 1.

FIG. 10 depicts a modification of the apparatus shown in FIG. 1. The apparatus shown in FIG. 10 includes an irradiation head 35 mounted on the XY drive unit 40 of the surface layer-removing unit 4 to output an optical beam received from the laser beam generator 30 of the sintered layer-forming unit 3 via an optical fiber 36. This construction contributes to a reduction in the number of parts.

Figure 11:
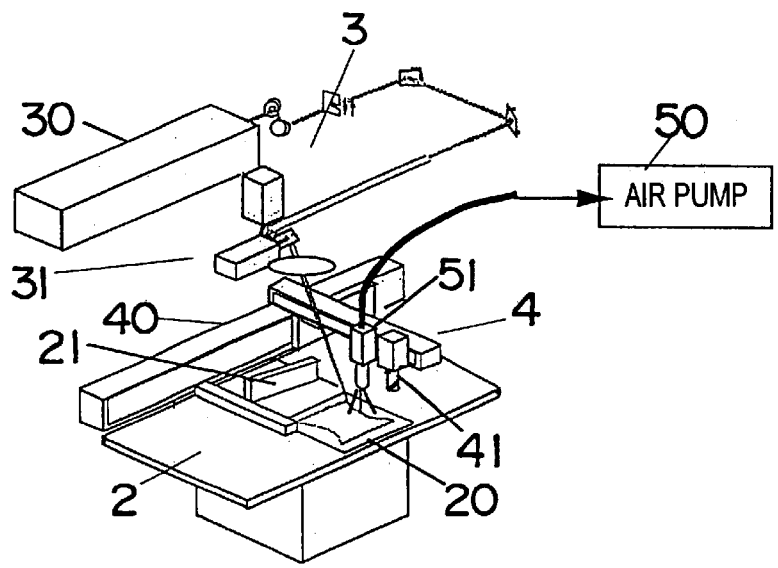
FIG. 11 is a schematic perspective view of another modification of the apparatus shown in FIG. 1.

FIG. 11 depicts another modification of the apparatus shown in FIG. 1. The apparatus shown in FIG. 11 includes a suction nozzle 51 disposed in the proximity of the finishing machine 41 and an air pump 50 connected to the suction nozzle 51. The suction nozzle 51 acts as a discharge means for discharging unsintered powder or swarf simultaneously with the cutting. The provision of the suction nozzle 51 is effective because not only unsintered powder or swarf impedes the removing work of the surface layer-removing unit 4 but also the swarf is occasionally caught by the leveling blade 21 and prevents the leveling blade 21 from forming a flat powder layer 10. Where the swarf is caught between the leveling blade 21 and the shaped object, the leveling blade 21 is occasionally brought into a standstill.

Figure 12A:
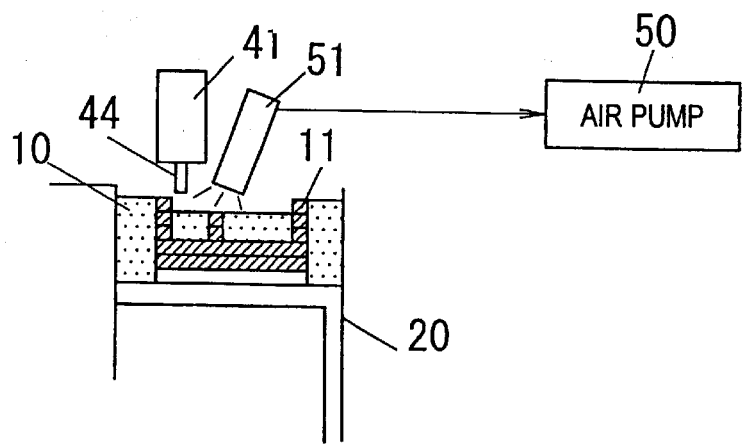
FIG. 12A is a schematic elevational view of a suction nozzle disposed above the shaped object.
Figure 12B:
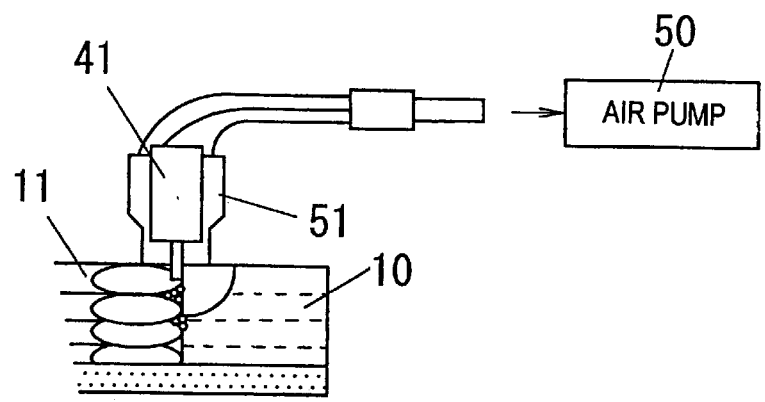
FIG. 12B is a schematic elevational view of another suction nozzle disposed above the shaped object.

FIG. 12A depicts the case where the suction nozzle 51 connected to the air pump 50 is disposed in a side-by-side fashion with the milling head 41, while FIG. 12B depicts the case where the milling head 41 is disposed within the suction nozzle 51 in a concentric fashion. That is, in both cases, the suction nozzle 51 is held in close proximity to the milling head 41.

Figure 13A:
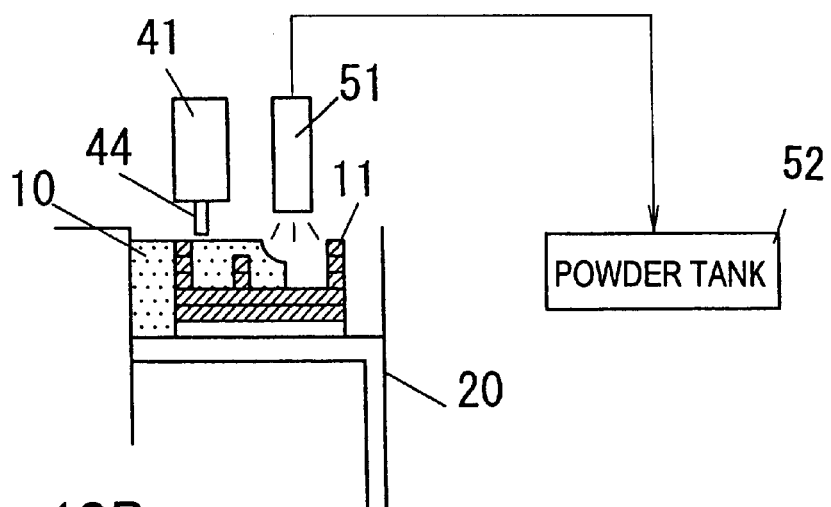
FIG. 13A is a schematic elevational view of a suction nozzle communicating with a powder tank.
Figure 13B:
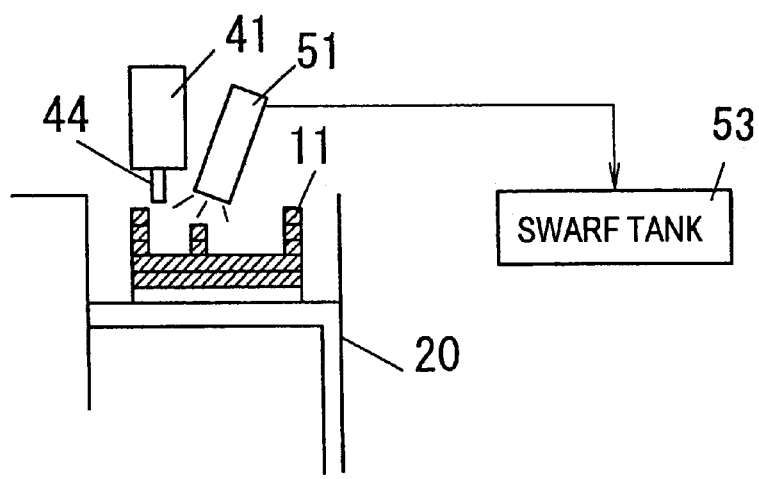
FIG. 13B is a view similar to FIG. 13A, in the case where the suction nozzle communicates with a swarf tank.

As shown in FIGS. 13A and 13B, the suction nozzle 51 may be so designed as to selectively communicate with a powder tank 52 or a swarf tank 53. In this case, prior to cutting, the suction nozzle 51 is caused to communicate with the powder tank 52 to introduce unsintered powder thereinto and, simultaneously with the cutting, the suction nozzle 51 is caused to communicate with the swarf tank 52 to introduce swarf thereinto. By so doing, no swarf is mixed into the unsintered powder, making it possible to reuse the unsintered powder.

In the meantime, if the unsintered powder is drawn and removed by the suction nozzle 51, a large quantity of powder is required for formation of a new powder layer 10 on the sintered layer or layers 11 after the removal of the unsintered powder. Accordingly, where the processes of removing the unsintered powder are repeated plural times, it becomes necessary to fill powder into an entire space from which the unsintered powder has been removed, prior to each sintering, resulting in a big loss in time.

Figure 14A:
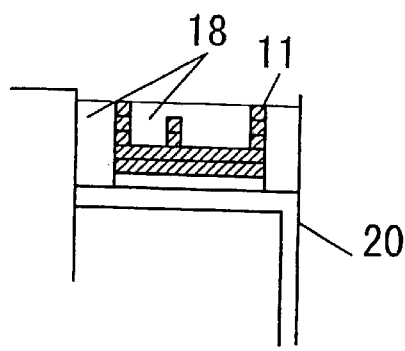
FIG. 14A is a schematic vertical sectional view of the shaped object when a space from which unsintered powder has been removed is filled with resin or wax.
Figure 14B:
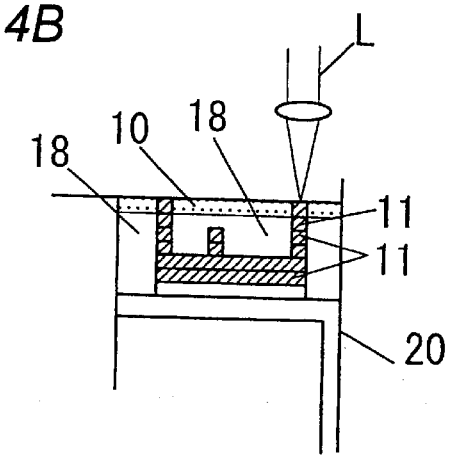
FIG. 14B is a view similar to FIG. 14A, when a new powder layer is formed on the shaped object of FIG. 14A.

To solve this problem, such a space may be filled with resin or wax, which is in turn solidified to form a solidified portion 18, as shown in FIG. 14A. In this case, the next powder layer 10 is formed on the uppermost sintered layer 11 and the solidified portion 18, as shown in FIG. 14B, making it possible to reduce the required amount of powder and prevent swarf from mixing into the unsintered powder.

Figure 14C:
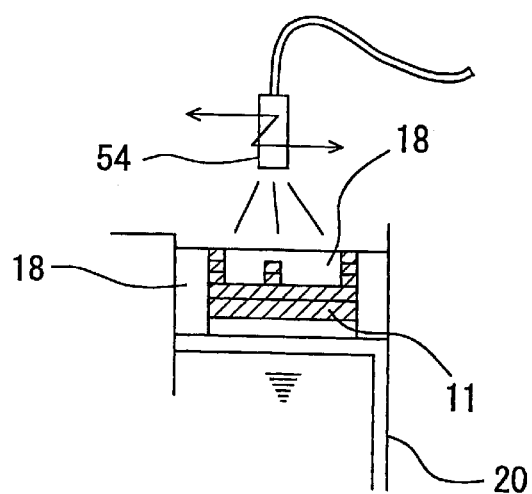
FIG. 14C is a view similar to FIG. 14A, but depicting the case wherein unsintered powder is solidified by freezing.

Alternatively, the unsintered powder can be solidified by freezing e.g., by blowing liquid nitrogen thereto from a nozzle 54, as shown in FIG. 14C. If necessary, a gas containing moisture may be used together with liquid nitrogen.

Although in the above-described embodiment a cutting tool is employed in the surface layer-removing unit 4, a high-power laser may be employed therein. By way of example, a Q-switched YAG laser having a peak output greater than 10 kW can remove the low-density surface layer 16 quickly by evaporating it instantaneously. Furthermore, the portion to be removed is not limited to the low-density surface layer 16. Even if a portion that is originally unnecessary is created depending on the shape of the target object, it can also be removed.

Figure 15:
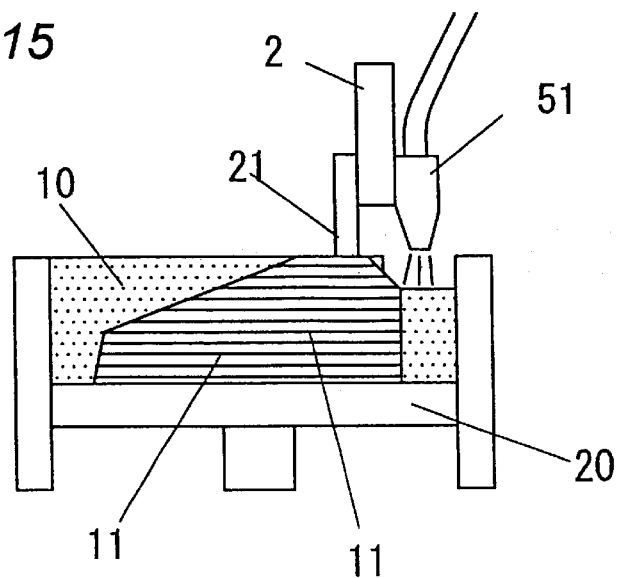
FIG. 15 is a schematic elevational view of the suction nozzle mounted on a drive unit for driving a leveling blade.

As shown in FIG. 15, it is preferred that the suction nozzle 51 be mounted on a drive unit for driving the leveling blade 21 in the powder layer-forming unit 2. This construction does not require any drive mechanism used exclusively for the suction nozzle 51, making it possible to simplify the structure of the apparatus.

Figure 16A:
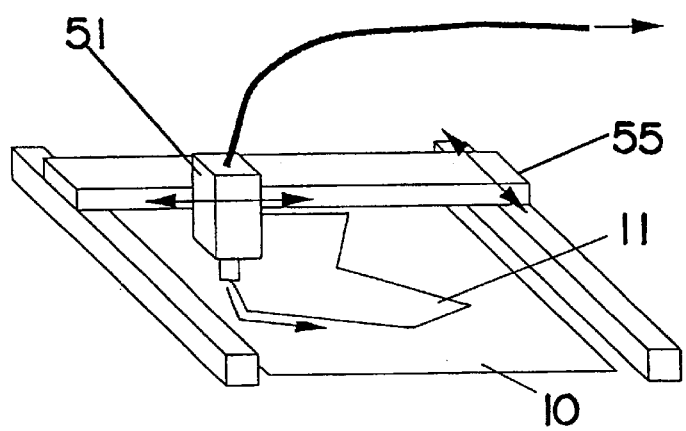
FIG. 16A is a perspective view of the suction nozzle mounted on an XY drive unit for exclusive use thereof.
Figure 16B:
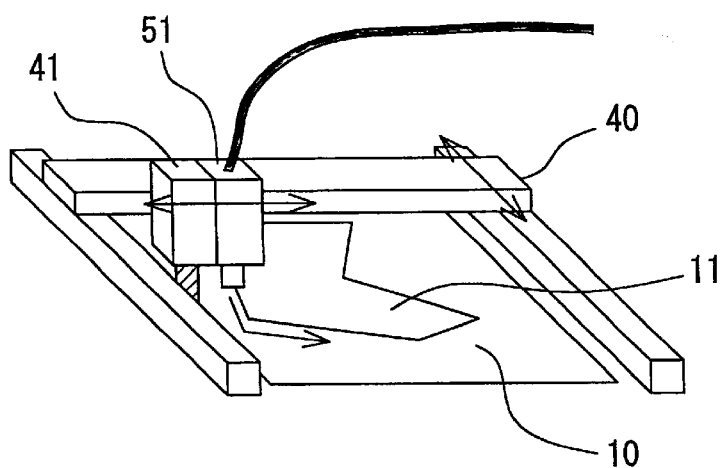
FIG. 16B is a view similar to FIG. 16A, depicting the suction nozzle mounted on an XY drive unit of a surface layer-removing unit.

On the other hand, the suction nozzle 51 may be mounted on an XY drive unit 55 for exclusive use thereof, as shown in FIG. 16A, or on the XY drive unit 40 of the surface layer-removing unit 4, as shown in FIG. 16B. The XY drive unit 40 or 55 is designed to move the suction nozzle 51 ahead of the finishing machine 41 and acts to move the suction nozzle 51 along the contour line of each plane to be shaped so that unsintered powder around the sintered layer or layers 11 may be removed by the suction nozzle 51. This construction prevents the surface layer-removing unit 4 from catching the unsintered powder, making it possible to obtain a highly accurate surface.

Figure 17:
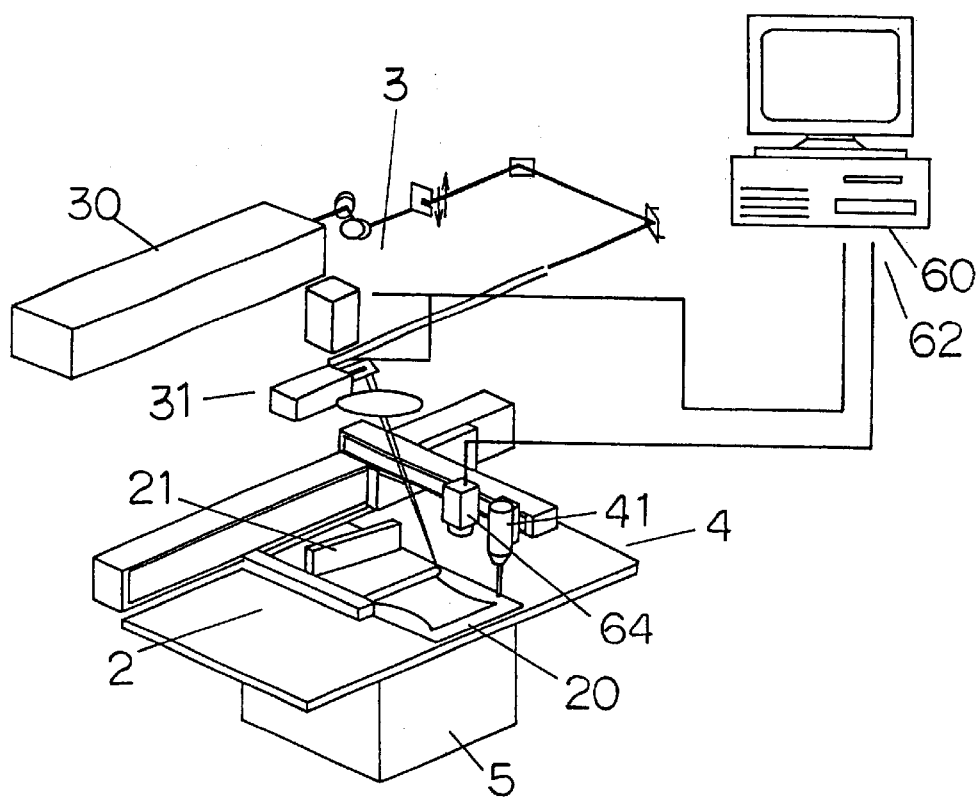
FIG. 17 is a schematic perspective view of an apparatus for making a three-dimensional object according to a second embodiment of the present invention.

FIG. 17 depicts an apparatus for making a three-dimensional object according to a second embodiment of the present invention. The apparatus shown therein includes a powder layer-forming unit 2 for forming a powder layer 10, a sintered layer-forming unit 3 for forming a sintered layer 11, and a surface layer-removing unit 4 for removing a low-density surface layer. The powder layer-forming unit 2 forms the powder layer 10 of a desired thickness Δt1 by supplying organic or inorganic powder material on a sintering table 20 that moves vertically within a space surrounded by a cylinder and by leveling the powder material with the use of a leveling blade 21. The sintering table 20 is driven by a drive unit 5 so as to move up and down. The sintered layer-forming unit 3 forms the sintered layer 11 by irradiating a laser emitted from a laser beam generator 30 on the powder layer 10 via a scanning optical system including a deflector 31 and the like. The surface layer-removing unit 4 includes an XY drive unit 40 mounted on a base thereof and a finishing machine 41 mounted on the XY drive unit 40. The apparatus shown in FIG. 17 further includes a controller 60 for controlling the above-described units and devices, and also includes an alignment unit 62 having a camera 64 for obtaining image data on the sintering table 20 and an alignment program to be executed by the controller 60.

In making a three-dimensional object of a desired shape using the apparatus referred to above, a base 22 is first made having a shape that corresponds to that of an entire lower structure of the three-dimensional object or that of a portion thereof. The base 22 may be of any material that can be united with a sintered layer formed thereon.

Figure 18A:
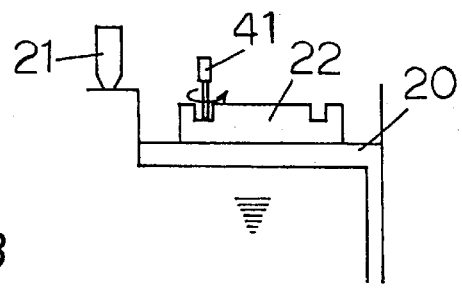
FIGS. 18A to 18D are schematic elevational views depicting how to form a plurality of sintered layers on a base.

As shown in FIG. 18A, the base 22 is placed on the sintering table 20, and a required machining is conducted with respect thereto by the finishing machine 41. This machining is conducted based on data indicative of the shape after machining, which data have been obtained by imposing the predetermined conditions on CAD data of the three-dimensional object in advance.

Figure 19:
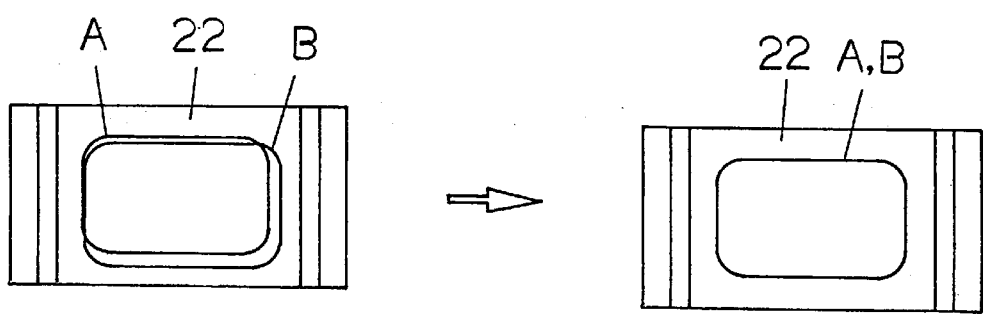
FIG. 19 is a top plan view of the base when the position where the irradiation of the optical beam is desired is being aligned with the position where the optical beam has been actually irradiated.
Figure 18B:
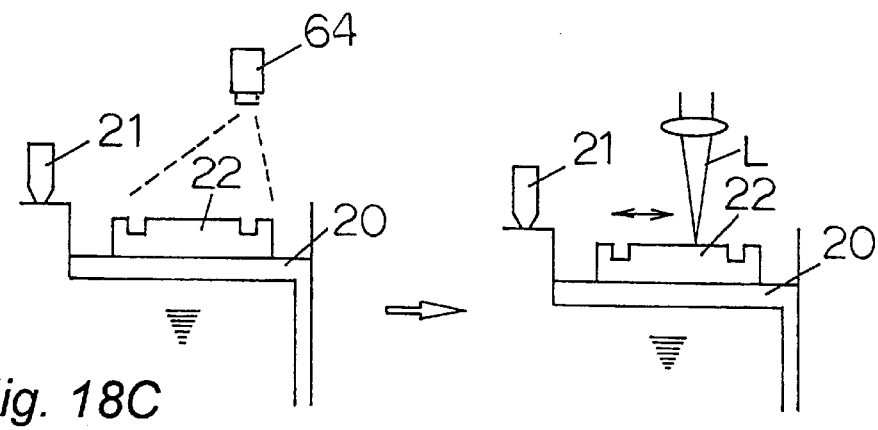

After the machining, as shown in FIG. 18B, the camera 64 is switched on to confirm the position of the base 22 on the sintering table 20 by obtaining image data thereof and detecting the contour line thereof as viewed from above so that the laser irradiating position may be coincident with the position on the surface of the base 22 where sintering is to be commenced. Thereafter, the surface of the base 22 is marked with an optical beam L having a small energy density, and image data of the marked position is obtained by the camera 64. At this moment, as shown in FIG. 19, if the position A where the irradiation of the optical beam L with respect to the base 22 is desired deviates from the position B where the optical beam L has been actually irradiated, the controller 60 detects the deviation between the coordinates of the base 22 and those of the optical beam irradiating system to correct it.

Figure 18C:
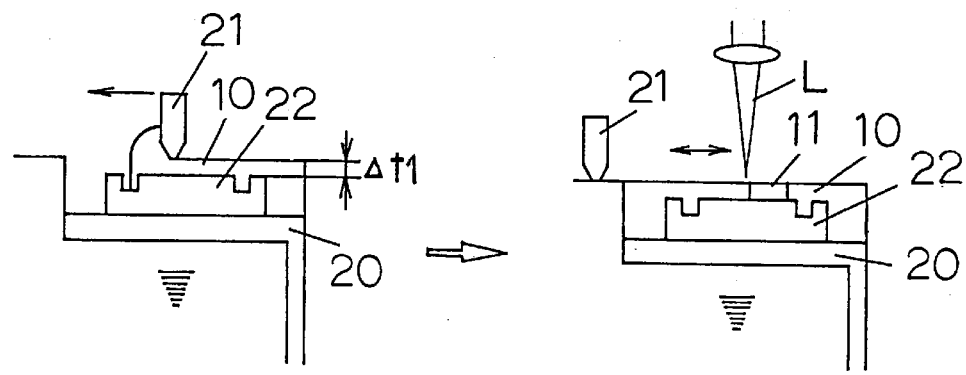
Figure 18D:
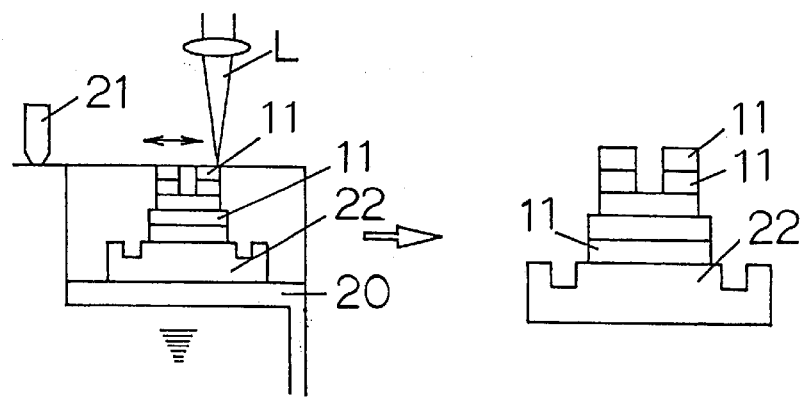

Upon completion of the alignment referred to above, as shown in FIG. 18C, the sintering table 20 is supplied with powder material, which is in turn leveled by the leveling blade 21 to form a powder layer 10 of a thickness Δt1. The powder layer 10 is then irradiated with the optical beam L for sintering of a desired region thereof. After the formation of the powder layer 10 and the sintering thereof by the optical beam L have been repeatedly carried out, the thee-dimensional object is obtained having a lower structure made up of the base 22 and an upper structure made up of a plurality of sintered layers 11 laminated one upon another, as shown in FIG. 18D.

The provision of the base 22 dispenses with a time-consuming work required to laminate and sinter a certain number of powder layers 10 corresponding to the thickness of the base 22.

If the time required for machining the base 22 is longer than the time required for forming a plurality of sintered layers 11 of the same shape as the base 22, the provision of the base 22 results in an increase in the time for making the three-dimensional object. Accordingly, the process for machining the base 22 and the process for forming the sintered layers 11 are simulated in advance, and if the time require for the former is shorter than the time required for the latter, the base 22 is employed.

Figure 20:
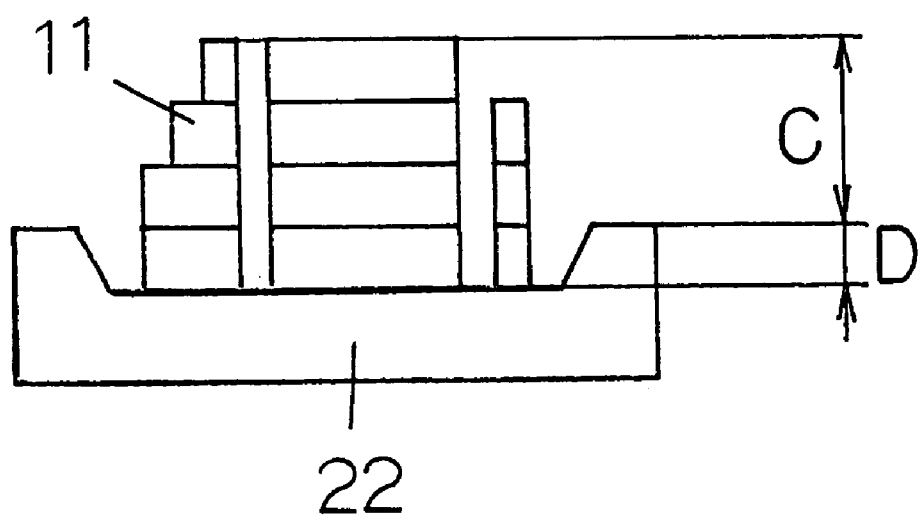
FIG. 20 is a schematic elevational view of an example of the three-dimensional object.
Figure 21A:
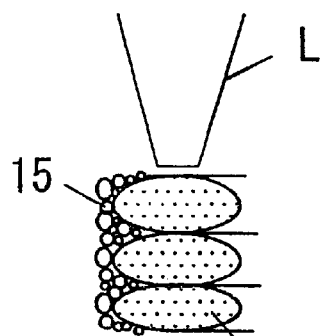
FIG. 21A is a vertical sectional view of a plurality of sintered layers, depicting a state where unnecessary powder adheres thereto.
Figure 21B:
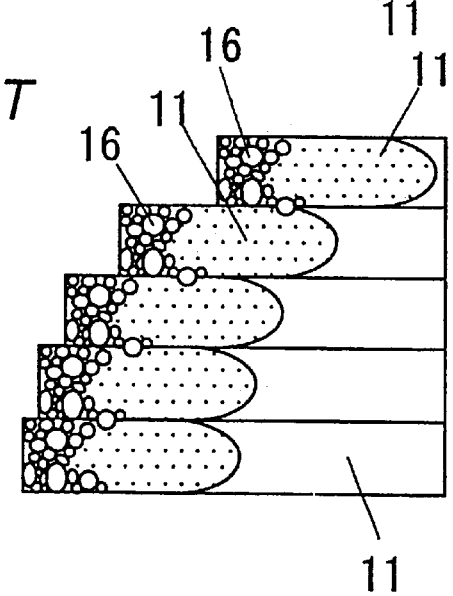
FIG. 21B is a vertical sectional view of a plurality of sintered layers having stepped outer portions.
Figure 21C:
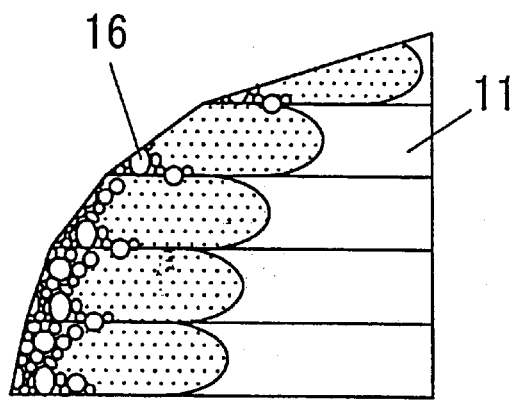
FIG. 21C is a vertical sectional view of the plurality of sintered layers after the stepped outer portions have been removed.

The use of the base 22 is further discussed with reference to a structure as shown in FIG. 20.

Only when the time required for making a portion C of the structure by machining is shorter than the time required for making it by laminating a plurality of sintered layers 11, the structure of FIG. 20 is employed as the base 22. In contrast, if the time required for making the portion C by machining is longer than the time required for making it by the lamination of the sintered layers 11, machining is carried out with respect to a portion D to create the base 22 not having the portion C.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

The present disclosure relates to subject matter contained in priority Japanese Patent Application Nos. 2000-306546, filed on Oct. 5, 2000, and 2001-192121, filed on Jun. 26, 2001, the contents of both of which are herein expressly incorporated by reference in their entireties.

What is claimed is:

1. An apparatus for making a three-dimensional object, comprising:

a powder layer-forming unit for forming a powder layer;

a sintered layer-forming unit for forming a sintered layer by irradiating an optical beam on a predetermined portion of the powder layer;

a distance regulator for regulating a distance between said sintered layer-forming unit and the sintered layer;

a surface layer-removing unit for removing a surface layer of a density lower than that of the sintered layer; and a discharge unit for discharging unsintered powder or swarf produced by the surface layer-removing unit, said discharge unit having a drive unit that acts to move said discharge unit along a contour line of each plane to be shaped.

2. A method of making a three-dimensional object, comprising the steps of:

(a) irradiating an optical beam on a predetermined portion of a powder layer to form a sintered layer;

(b) covering the sintered layer with a new powder layer;

(c) irradiating the optical beam on a predetermined portion of the new powder layer to form another sintered layer that has been united with the underlying sintered layer;

(d) repeating the steps (b) and (c) to form a plurality of sintered layers united together, which have a size greater than that of a target shape of the three dimensional object; and (e) removing a surface region of a shaped object formed by then during the step (d); and further comprising, prior to the step (a), the steps of:

(a1) placing on a sintering table a base that constitutes a lower structure of the three-dimensional object;

(a2) machining the base; and (a3) aligning the base with an optical beam irradiating position.

3. The method according to claim 2, further comprising, prior to the step (a1), the steps of;

comparing a time required for machining the base with a time required for forming a plurality of sintered layers of a same shape as the base; and making the base if the former is determined to be shorter than the latter.

4. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d), and the surface region removed has a thickness greater than a thickness of a surface layer created by adhesion of powder material to the sintered layers, the surface layer having a density lower than that of the sintered layers.

5. The method according to claim 4, wherein the sintered layers are exposed by the removal of the surface region.

6. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d) by cutting.

7. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d) by a laser.

8. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d); and
further comprising, prior to the step (e), the step of irradiating an optical beam on a portion to be removed to soften such portion.

9. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d); and
further comprising, after the step (e), the step of irradiating an optical beam on a portion of the shaped object from which the surface region has been removed, thereby increasing the density of such portion.

10. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d), and unsintered powder around the sintered layers or swarf produced by the removal of the surface region is removed during the step (e).

11. A method of making a three-dimensional object, comprising the steps of:
(a) irradiating an optical beam on a predetermined portion of a powder layer to form a sintered layer;
(b) covering the sintered layer with a new powder layer;
(c) irradiating the optical beam on a predetermined portion of the new powder layer to form another sintered layer that has been united with the underlying sintered layer;
(d) repeating the steps (b) and (c) to form a plurality of sintered layers united together, which have a size greater than that of a target shape of the three dimensional object; and
(e) removing a surface region of a shaped object formed by then during the step (d); and
further comprising, prior to the step (e), the step of removing unsintered powder around the sintered layers.

12. The method according to claim 10, further comprising, after the step (e), the step of filling resin or wax into a space from which the unsintered powder or swarf has been removed.

13. A method of making a three-dimensional object, comprising the steps of:

(a) irradiating an optical beam on a predetermined portion of a powder layer to form a sintered layer;

(b) covering the sintered layer with a new powder layer;

(c) irradiating the optical beam on a predetermined portion of the new powder layer to form another sintered layer that has been united with the underlying sintered layer;

(d) repeating the steps (b) and (c) to form a plurality of sintered layers united together, which have a size greater than that of a target shape of the three dimensional object; and (e) removing a surface region of a shaped object formed by then during the step (d); and further comprising, prior to the step (e), the step of solidifying the unsintered powder.

14. The method according to claim 13, wherein the unsintered powder is solidified by freezing.

15. The method according to claim 13, wherein the unsintered powder is solidified using resin or wax.

16. An apparatus for making a three-dimensional object, comprising:

a powder layer-forming unit for forming a powder layer;

a sintered layer-forming unit for forming a sintered layer by irradiating an optical beam on a predetermined portion of the powder layer;

a distance regulator for regulating a distance between said sintered layer-forming unit and the sintered layer;

a surface layer-removing unit for removing a surface layer of a density lower than that of the sintered layer; and a discharge unit held in close proximity to said powder layer-forming unit for discharging unsintered powder or swarf produced by the surface layer-removing unit.

* * * * *